United States Patent [19]

Kobayashi et al.

[11] Patent Number: 4,889,893
[45] Date of Patent: Dec. 26, 1989

[54] POLYPHENYLENE SULFIDE RESIN COMPOSITION AND A PROCESS FOR PRODUCING IT

[75] Inventors: Hirokazu Kobayashi; Akihiko Kishimoto, both of Nagoya, Japan

[73] Assignee: Toray Industries, Tokyo, Japan

[21] Appl. No.: 142,669

[22] Filed: Jan. 7, 1988

Related U.S. Application Data

[63] Continuation-in-part of Ser. No. 942,509, Dec. 16, 1986, abandoned.

[30] Foreign Application Priority Data

Dec. 27, 1985 [JP] Japan .................................. 60-292801
Dec. 27, 1985 [JP] Japan .................................. 60-292802

[51] Int. Cl.$^4$ ............................................. C08L 81/04
[52] U.S. Cl. ..................................... 525/189; 525/537; 524/500
[58] Field of Search ................................ 525/189, 537

[56] References Cited

U.S. PATENT DOCUMENTS 3,948,865 4/1976 Brady et al. ........................ 427/388
4,525,579 6/1985 Idel et al. ............................ 528/388

FOREIGN PATENT DOCUMENTS 154757 9/1983 Japan .................................. 525/189
152953 8/1984 Japan .................................. 525/189
189166 10/1984 Japan .................................. 525/189
191761 10/1984 Japan .................................. 525/189

*Primary Examiner*—John C. Bleutge
*Assistant Examiner*—David W. Woodward
*Attorney, Agent, or Firm*—Austin R. Miller

[57] ABSTRACT

A polyphenylene sulfide resin composition having excellent impact properties is provided which comprises:
(A) a polyphenylene sulfide resin and
(B) an olefinic copolymer containing 60 to 99.5% by weight of an α-olefin and 0.5 to 40% by weight of a glycidyl ester of an α,β-unsaturated carboxylic acid, and which is characterized in that the polyphenylene sulfide resin (A) is contacted to improve its affinity with the olefinic copolymer (B).

9 Claims, No Drawings

POLYPHENYLENE SULFIDE RESIN COMPOSITION AND A PROCESS FOR PRODUCING IT

BACKGROUND OF THE INVENTION

This invention is a continuation-in-part of the application Ser. No. 942,509, filed Dec. 16, 1986, now abandoned.

BACKGROUND OF THE INVENTION

The present invention relates to a polyphenylene sulfide resin composition having improved impact properties and a process for producing it. More particularly, the invention relates to a polyphenylene sulfide resin composition comprising a special polyphenylene sulfide resin and an olefinic copolymer and having improved impact properties.

A polyphenylene sulfide resin composition having improved impact properties comprising an ordinary polyphenylene sulfide and an olefinic copolymer of an olefin with a glycidyl ester of an α,β-unsaturated acid was disclosed in the specification of Japanese Patent Laid-Open No. 154757/1983.

However, the impact properties of the composition disclosed in said specification are yet insufficient, though they have been improved to some extent. More particularly, since, as is well known, the molecular chain of the ordinary polyphenylene sulfide resin is not so reactive, even when a highly reactive rubber component having an epoxy group, such as an olefinic copolymer mentioned in said specification, is incorporated therein, the adhesion thereof to the polyphenylene sulfide at the interface is insufficient. Thus, no sufficient effect of improving the impact properties has been obtained as yet.

SUMMARY OF THE INVENTION

The first object of the present invention is to provide a polyphenylene sulfide resin composition having excellent impact properties.

The second object of the present invention is to provide a process for producing the polyphenylene sulfide resin composition having excellent impact properties.

The third object of the present invention is to provide a process for further improving the impact properties of an ordinary impact-resistant polyphenylene sulfide resin composition.

The first object of the present invention can be attained by providing a polyphenylene sulfide resin composition comprising:

(A) 99.5 to 50% by weight of a polyphenylene sulfide resin and
(B) 0.5 to 50% by weight of an olefinic copolymer containing 60 to 99.5% by weight of a glycidyl ester of an α,β-unsaturated carboxylic acid, characterized in that said polyphenylene sulfide resin (A) is treated by at least one selected from the group consisting of an acid, hot water and an organic solvent, to improve its affinity with said olefinic copolymer (B).

The second object of the present invention can be attained by providing a process for producing a polyphenylene sulfide resin composition comprising the steps of:

(1) a polyphenylene sulfide resin (A) treated by at least one selected from the group consisting of an acid, hot water and an organic solvent to improve its affinity with the following copolymer (B), and (2) melt-mixing 99.5 to 50% by weight of said resin (A) and 0.5 to 50% by weight of an olefinic copolymer (B) containing 60 to 99.5% by weight of an α-olefin and 0.5 to 40% by weight of a glycidyl ester of an α,β-unsaturated carboxylic acid.

PREFERRED EMBODIMENTS OF THE INVENTION

The polyphenylene sulfide (hereinafter referred to as PPS) used in the present invention is a polymer comprising at least 70 molar %, preferably at least 90 molar %, of recurring units of the structural formula:

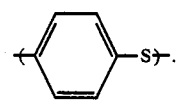

When the amount of said recurring units is less than 70 molar %, the heat resistance is insufficient.

PPS include generally those having a relatively low weight prepared by, for example, a process disclosed in the specification of U.S. Pat. No. 3,354,129 and essentially linear polymers having a relatively high molecular weight prepared by, for example, a process disclosed in the specification of U.S. Pat. No. 3,919,177. The degree of polymerization of the polymers prepared by the process of U.S. Pat. No. 3,354,129 can be further increased by heating the same in an oxygen atmosphere or in the presence of a crosslinking agent such as a peroxide after the polymerization. Though PPS prepared by any process can be used in the present invention, an essentially linear polymer having a relatively high molecular weight prepared by the process of the said U.S. Pat. No. 3,919,177 is preferably used.

30 molar % or less of the recurring units of PPS can be those of the following structural formulae:

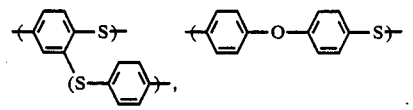

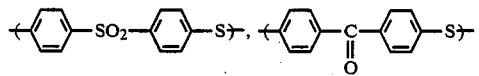

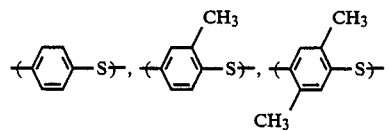

Though the melt viscosity of PPS used in the present invention is not particularly limited so far as the moldings can be obtained, a melt viscosity of at least 100 P is preferred from the viewpoint of the toughness of PPS per se and that of 10,000 P or less is preferred from the viewpoint of the moldability.

The above-mentioned PPS must be treated so as to increase its affinity with an olefinic copolymer shown below in the present invention.

The treatment is effected with an acid, hot water, an organic solvent or a combination of them.

The treatment with the acid according to the present invention is as follows. The acids used for the treatment of PPS according to the present invention are not particularly limited so far as they do not decompose PPS. Examples of the acids include acetic, hydrochloric, sulfuric, phosphoric, silicic, carbonic and propionic acids. Among them, acetic and hydrochloric acids are preferred. Acids which decompose or deteriorate PPS, such as nitric acid, are not preferred.

In the present invention, a salt or alkali is not preferred to the treatment for PPS since the intended chemical modification of PPS cannot be effected.

The acid treatment is effected by immercing PPS in an acid or a solution of an acid in a solvent such as water, methanol, ethanol, acetone or toluene, if necessary, under stirring or heating suitably. For example, when acetic acid is used, an aqueous solution thereof having a pH of 4 is heated to 80° to 90° C. and the PPS powder is immersed therein for 30 min under stirring to obtain sufficient effects. PPS thus treated with the acid is washed with water or warm water several times so as to remove the acid or salt physically.

Water used for the washing is preferably distilled water or deionized water so as not to damage the effect of the acid on the desired chemical modification of PPS. The washing can be effected with hot water of 100° C. or higher in a pressure vessel so as to increase the washing efficiency.

PPS subjected to the acid treatment according to the present invention is preferably in the form of powdery particles so as to increase the efficiencies of the acid treatment and washing. PPS prepared by a known process is usually in the form of powdery particles, which are subjected preferably directly to the acid treatment and washing without effecting pelletization or, if necessary, the powdery particles can be classified or finely divided.

Wet PPS immediately after the polymerization can be subjected directly to the acid treatment.

The treatment with hot water according to the present invention is as follows. In the treatment of PPS with hot water according to the present invention, it is important that the temperature of the hot water be at least 100° C., preferably at least 120° C., still preferably at least 150° C. and particularly at least 170° C. A temperature of below 100° C. is not preferred, since the desired chemical modification of PPS is only slight at such a low temperature.

Water used for the washing is preferably distilled water or deionized water so as to obtain the preferred effect of the chemical modification of PPS by the washing with hot water according to the present invention. The treatment with hot water is effected usually by adding a given amount of PPS to a given amount of water and heating the mixture under stirring in a pressure vessel. Though a large amount of water is preferred, the bath ratio of PPS to water is usually 200 g or less of PPS per liter of water.

The treatment is effected in an inert atmosphere so as to avoid undesired decomposition of terminal groups. PPS thus treated with hot water is preferably washed with warm water several times so as to physically remove the remining components.

PPS to be subjected to the treatment with hot water according to the present invention is preferably in the form of powdery particles, particularly fine particles, so as to obtain a high treatment efficiency. PPS prepared by a known process is usually in the form of powdery particles, which are subjected preferably directly to the treatment with hot water without effecting pelletization or, if necessary, the powdery particles can be classified or finely divided.

Wet PPS immediately after the polymerization can be subjected directly to the treatment with hot water.

The treatment with the organic solvent according to the present invention is as follows. The organic solvents used for the treatment of PPS according to the present invention are not particularly limited so far as they do not decompose PPS. Examples of the organic solvent include the nitrogen containing polar solvents such as N-methylpyrolidone, N,N-dimethylformamide, N,N,-dimethylacetamide, 1,3-dimethylimidazolidinone, hexamethylphosphorylamide, piperadinone group and so on, sulfoxide, sulfone group solvents such as dimethyl sulfoxide, dimethyl sulfone, sulfolane, and so on, ketone group solvents such as acetone, methyl ethyl ketone, diethyl ketone, acetophenone, ether group solvents such as diethyl ether, dipropyl ether, dioxane, tetrahydrofurane, halide group solvents such as chloroform, methylene dichloride, trichloroethylene, ethylene dichloride, perchloroethylene, monochloroethane, dichloroethanen, tetrachloroethane perchloroethane, chlorobenzene and so on, alcohol . phenol group solvents such as methanol, ethanol, propanol, butanol, pentanol, ethyleneglycol, propylene glycol, phenol, cresol, polyethylene glycol, polypropylene glycol and so on, aromatic hydrocarbon group solvents such as benzene toluene, xylene and so on. Among them, N-methyl pyrolidone, acetone, N,N-dimethyl formamide dimethyl sulfoxide and chloroform are preferred.

The organic solvent treatment is effected by immersing PPS in an organic solvent if necessary, under stirring or heating suitably. It is not limited when PPS is treated with the organic solvent after polymerization.

PPS after polymerization and wash/dry may be treated with the organic solvent, and wet PPS with polymerization solvent or with washing water directly, may be treated with the organic solvent. Moreover, PPS polymerization mixture may be mixed with the organic solvent for PPS to be treated with the organic solvent.

The temperature at the organic solvent treatment is not particularly limited, and the temperature can be choiced from room temperature to about 300° C. Nevertheless the higher temperature at the organic solvent treatment, the more effects can be obtained, ordinary sufficient organic solvent treatment effects can be obtained at room temperature −150° C.

It is possible to treat with the organic solvent at above boiling point of the organic solvent under high pressure. The period of the organic solvent treatment is not particularly limited. In the case of the batch treatment system, ordinary enough effect can be obtained by treating PPS with the organic solvent for over 5 minutes. And the continuous treatment system can be also applied. PPS thus treated with the organic solvent is preferred to be washed with water or warm water so as to remove inorganic impurities. And when the used organic solvent have high boiling point and can be dissolved in water such as N-methyl pyrrolidone or N,N-dimethyl form- amide, wash with water or warm particularly prefers to remove the high boiling point organic solvent. Water used for the washing is preferably distilled water or deionized water so as not to damage the effect of the organic solvent treatment of PPS. The washing can be effected with hot water of 100° C.

or higher in a pressure vessel so as to increase the washing efficiency.

PPS subjected to the organic solvent treatment according to the present invention is preferably in the form of powdery particles so as to increase the efficiencies of the acid treatment and washing. PPS prepared by a known process is usually in the form of powdery particles, which are subjected preferably directly to the organic solvent treatment and washing without effecting pelletization or, if necessary, the powdery particles can be classified or finely divided.

Though sufficient effects can be obtained by carrying out either the acid treatment, hot water treatment or the organic solvent treatment of PPS, a combination of these treatments can be employed. For example, PPS can be treated with the acid and then with hot water, treated with the organic solvent and then with hot water or treated with the organic solvent, with the acid and then with hot water, and so on.

Though the detailed mechanism of the improvement in the affinity of PPS with the olefinic copolymer by the treatment with the acid or hot water has not fully been elucidated, it is supposed that —COONa, —ONa, etc. at the terminal of the PPS molecular chain are converted into —COOH, —OH, etc., respectively, by the treatment with the acid or hot water to improve the affinity with the olefinic copolymer.

PPS used in the present invention may further contain ordinary additives such as antioxidants, heat stabilizers, lubricants, nucleating agents, U.V.-screening agents and colorants in amounts which are not detrimental to the effects of the present invention as well as small amounts of various polymers. Further, ordinary peroxides used for controlling the degree of crosslinking of PPS, crosslinking accelerating agents such as metal salts of thiophosphinic acid as disclosed in the specification of U.S. Pat. No. 4,421,910, and crosslinking inhibitors such as dialkyltin dicarboxylates and aminotriazole disclosed in the specifications of U.S. Pat. No. 4,411,853 and 4,434,122 can be incorporated in PPS.

The olefinic copolymers (B) used in the present invention are copolymers of an α-olefin with a glycidyl ester of an "α,β-olefin" as used herein means ethylene, propylene, butene-1, etc. Among them, ethylene is preferred. The glycidyl esters of the α,β-unsaturated acids are compounds of the general formula:

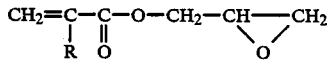

wherein R represents a hydrogen atom or a lower alkyl group. Examples of the glycidyl esters of α,β-unsaturated acids include glycidyl acrylate, methacrylate and ethacrylate is preferred. The amount of the glycidyl ester of the α,β-unsaturated acid in the olefinic copolymer is 0.5 to 40 wt.%, preferably 3 to 30 wt.%. When this amount is less than 0.5 wt.%, no intended effects can be obtained and, on the contrary, when it exceeds 40 wt.%, gelation occurs during melt-blending with PPS to damage the extrusion stability, moldability and mechanical properties of the product.

The olefinic copolymer may further be copolymerized with 40 wt.% or less of another copolymerizable unsaturated monomer such as vinyl ether, vinyl acetate, vinyl propionate, methyl acrylate, methyl methacrylate, acrylonitrile or styrene.

In the present invention, the proportions of PPS and the olefinic copolymer should be 99.5 to 50% by weight and 0.5 to 50% by weight respectively. When the amount of the olefinic copolymer is less than 0.5% by weight, no intended effect can be obtained easily and when it exceed 50% by weight, the strength, rigidity and heat resistance of PPS are reduced and gelation take place during the melt blending step to damage the extrusion stability and moldability.

The proportions of PPS and the olefinic copolymer are preferably 99 to 55% by weight and 1 to 45% by weight respectively.

Fibrous and/or granular reinforcing agent can be incorporated in an amount of 300 parts by weight or less for 100 parts by weight of the total of the PPS and the olefinic copolymer, if necessary, in the present invention. Usually, the strength, rigidity, heat resistance and dimensional stability of the product can be improved usually by incorporating 10 to 300 parts by weight of the reinforcing agent.

The fibrous reinforcing agents include inoragnic and carbonaceous fibers, such as glass fibers, shirasu glass fibers, alumina fibers, silicon carbide fibers, ceramic fibers, asbestos fibers, gypsum fibers and metal fibers.

Examples of the granular reinforcing agents include silicates such as wollastonite, sericite, kaolin, mica, clay, bentonite, asbestos, talc, alumina silicate; metal oxides such as alumina and oxides of silicon, magnesium, zirconium and titanium; carbonates such as calcium and magnesium carbonates and dolomite; sulfates such as calcium and barium sulfates; as well as glass beads, boron nitride, silicon carbide, sialon and silica. These granules may be hollow. These reinforcing agents may be used either alone or in the form of a mixture of two or more of them. If necessary, they can be pretreated with a silane or titanium coupling agent.

Processes for preparing the composition of the present invention are not particularly limited. A typical process for the preparation thereof comprises melt-kneading PPS, the olefinic copolymer and the reinforcing agent at a temperature above the melting point of PPS in an extruder and then pelletizing the obtained mixture.

The melt-kneading temperature is preferably 280° to 340° C. At a temperature below 280° C., PPS is often molten insufficiently and at a temperature above 340° C., the olefinic copolymer is often thermally deteriorated or gels. Thus, the melt-kneading temperature must be selected carefully.

The following examples will further illustrate the present invention, which by no means limit the invention.

REFERENTIAL EXAMPLE 1
(POLYMERIZATION OF PPS)

3.26 kg (25 mol; including 40% of water of crystallization) of sodium sulfide, 4 g of sodium hydroxide, 1.36 kg (about 10 mol) of sodium acetate trihydrate and 7.9 kg of N-methyl-2-pyrrolidone (hereinafter referred to as NMP) were placed in an autoclave and the temperature was elevated slowly to 205° C. under stirring to remove about 1.5 l of an aqueous distillate comprising 1.36 kg of water. 3.75 kg (25.5 mol) of 1,4-dichlorobenzene and 2 kg of NMP were added to the residual mixture and the obtained mixture was heated to 265° C. for 4 h. The reaction product was washed with warm water (70° C.) five times and then dried at 80° C. under reduced pressure for 24 h to obtain about 2 kg of a powder having a melt viscosity of about 2500 P (320° C., shear rate: 1000 sec$^{-1}$).

The PPS powder thus obtained was used in the following examples.

EXAMPLE 1

About 2 kg of the PPS powder prepared in Referential Example 1 was added to 20 l of an aqueous acetic acid solution having a pH of 4 heated to 90° C. The mixture was stirred continuously for about 30 min, filtered, washed with deionized water at about 90° C. until the pH of the filtrate reached 7 and dried at 120° C. under reduced pressure for 24 h to obtain a powder.

The powder obtained as above was dry-blended with ethylene/glycidyl methacrylate (weight ratio: 88/12) copolymer (hereinafter referred to as olefinic copolymer) in a weight ratio of 80/20. The mixture was melt-mixed and pelletized in a screw extruder at 290° to 310° C. Then, the pellets were fed in a screw in-line type injection molding machine at 290° to 300° C. to prepare test pieces for the evaluation of mechanical properties at a mold temperature of 140° to 150° C.

Izod impact strength (ASTM D-256) and heat distortion temperature (ASTM D-648) of the obtained test pieces were as shown in Table 1. It is apparent that they have an extremely high impact strength and the degree of lowering of the heat distortion temperature from the olefinic copolymer free test pieces was very small.

COMPARATIVE EXAMPLES 1 AND 2

The PPS powder prepared in Referential Example 1 (Comparative Example 1) or the same powder which was further treated with acetic acid, washed and dried in the same manner as in Example 1 (Comparative Example 2) was directly (without adding any olefinic copolymer) pelletized and injection-molded to obtain test pieces. The Izod impact strength and heat distortion temperature of the test pieces were as shown in Table 1.

COMPARATIVE EXAMPLES 1 AND 2

The same procedure as in Example 1 was repeated except that the PPS powder prepared in Referential Example 1 was used as it was without any treatment with acetic acid. More particularly, the PPS powder was melt-mixed with the olefinic copolymer and the mixture was pelletized and injection-molded to obtain test pieces. The Izod impact strength and heat distortion temperature of the test pieces were as shown in Table 1.

EXAMPLE 2

The same procedure as in Example 1 was repeated except that acetic acid used for the acid treatment of the PPS powder obtained in Referential Example 1 wa replaced with hydrochloric acid of pH 4 to obtain test pieces.

The properties of the obtained test pieces were as shown in Table 1.

EXAMPLE 3

The same procedure as in Example 1 was repeated except that the ethylene/glycidyl methacrylate (weight ratio: 88/12) copolymer was replaced with the copolymer having the weight ratio of 94/6 to obtain test pieces. The properties of the obtained test pieces were as shown in Table 1.

EXAMPLE 4

The same procedure as in Example 1 was repeated except that the amount of the olefinic copolymer was altered from 20 wt.% to 10 wt.%. The properties of the obtained test pieces were as shown in Table 1.

EXAMPLES 5 AND 6

The PPS powder acid-treated in the same manner as in Example 1, the olefinic copolymer and glass fibers were melt-mixed and the mixture was pelletized and injection-molded in the same manner as in Example 1. The properties of the obtained test pieces were as shown in Table 1.

COMPARATIVE EXAMPLES 4 AND 5

The PPS powder obtained in Referential Example 1 was melt-mixed with glass fibers (Comparative Example 4) or, alternatively, said PPS, the olefinic copolymer and glass fibers were melt-mixed together (Comparative Example 5) in a ratio shown in Table 1. The mixture was pelletized and injection-molded in the same manner as in Example 1. The properties of the obtained test pieces were as shown in Table 1.

TABLE 1

| No. | Acid treatment of PPS | Acid used for treatment | Comonomer[1] ratio of olefinic copolymer | Proportion PPS[2] (wt. %) | Olefinic[2] copolymer (wt. %) | Glass[3] fibers (wt. %) | Izod impact strength With cut notch (kg · cm/cm) | Without notch (kg · cm/cm) | Heat distortion temp. (high-load) (18.56 kg/cm$^2$) (°C.) |
|---|---|---|---|---|---|---|---|---|---|
| Example | | | | | | | | | |
| 1 | Treated | Acetic acid | 88/12 | 80 | 20 | — | 65 | 120 | 101 |
| 2 | Treated | Hydrochloric acid | 88/12 | 80 | 20 | — | 63 | 120 | 101 |
| 3 | Treated | Acetic acid | 94/6 | 80 | 20 | — | 17 | 120 | 102 |
| 4 | Treated | Acetic acid | 88/12 | 90 | 10 | — | 33 | 120 | 102 |
| 5 | Treated | Acetic acid | 88/12 | 80 | 20 | 70 | 17 | 59 | 254 |
| 6 | Treated | Acetic acid | 88/12 | 90 | 10 | 70 | 15 | 48 | 255 |
| Comp. Ex. | | | | | | | | | |
| 1 | Untreated | — | — | 100 | 0 | — | 2.2 | 57 | 110 |
| 2 | Treated | Acetic acid | — | 100 | 0 | — | 2.1 | 58 | 110 |
| 3 | Untreated | — | 88/12 | 80 | 20 | — | 3.5 | 59 | 100 |
| 4 | Untreated | — | — | 100 | 0 | 70 | 6.5 | 37 | 256 |
| 5 | Untreated | — | 88/12 | 80 | 20 | 70 | 6.8 | 39 | 253 |

Notes:
[1]Weight ratio of ethylene to glycidyl methacrylate
[2]Ratio to the total of PPS and ethylene/glycidyl methacrylate copolymer (wt. %)
[3]Amount (parts by weight for 100 parts by weight of the total of PPS and ethylene/glycidyl methacrylate copolymer.

EXAMPLE 7

The PPS powder acid-treated in the same manner as in Example 1 was dry-blended with the olefinic copolymer and polyethylene in a weight ratio of 80/10/10. After the melt-mixing followed by the pelletization and injection molding carried out in the same manner as in Example 1, test pieces were obtained. The test pieces had an Izod impact strength (cut and notched) of 38 kg·cm/cm-notch and heat distortion temperature (high-load) of 103° C.

EXAMPLE 8

The same procedure as in Example 7 was repeated except that polyethylene was replaced with polyethylene/polypropylene copolymer grafted with maleic anhydride N-Toughmer MP-0610; a product of Mitsui Petrochemical Industries, Ltd.) to obtain test pieces. The test pieces had an Izod impact strength (cut and notched) of 42 kg·cm/cm-notch and heat distortion temperature (high-load) of 104° C.

EXAMPLE 9

The PPS powder acid-treated in the same manner as in Example 1 was dry blended with the olefinic copolymer in a weight ratio of 70/30. After the melt-mixing follows by the pelletization and injection molding carried out in the same manner as in Example 1, test pieces were obtained. The test pieces had an Izod impact strength of 69 kg·cm/cm-notch and heat distortion temperature (high-load) of 101° C.

EXAMPLE 10

The PPS powder acid-treated in the same manner as in Example 1 was dry blended with the olefinic copolymer in a weight ratio of 60/40. After the melt-mixing follow by the pelletization and injection molding carried out in the same manner as in Example 1, test pieces were obtained. The test pieces had an Izod impact strength of 72 kg·cm/cm-notch and heat distortion temperature (high-load) of 100° C.

COMPARATIVE EXAMPLE 6

The PPS powder acid-treated in the same manner as in Example 1 was dry blended with the olefinic copolymer in a weight ratio of 40/60. The mixture was attempted to be melt-mixed and pelletized in a screw extruder at 290 to 310° C. in the same manner as in Examples 1 to 11. But it is impossible to be melt-mixed and pelletized because of its increased viscosity with violence and gelation.

EXAMPLE 11

2 kg of the PPS powder obtained in Referential Example 1 and 10 l of deionized water were placed in a autoclave, which was then closed under atmospheric pressure. The temperature was elevated to 180° C. and the mixture was kept at that temperature under stirring for about 30 min and then cooled. The mixture was taken out and filtered. PPS was immersed in about 10 l of deionized water at 70° C., stirred and filtered. This procedure was repeated five times. The product was dried at 120° C. under reduced pressure for 24 h to obtain a powder.

The powder was dry-blended with ethylene/glycidyl methacrylate (weight ratio: 88/12) copolymer (hereinafter referred to as "olefinic copolymer") in a weight ratio of 80/20. The mixture was melt-mixed in a screw extruder kept at 290° to 310° C. and pelletized. The obtained pellets were fed in a screw in-line type injection molding machine kept at 290° to 300° C. to obtain test pieces to be subjected to the mechanical property tests at a mold temperature of 140° to 150° C.

The Izod impact strength (ASTM D-256) and heat distortion temperature (ASTM D-648) of the test pieces thus obtained were as shown in Table 2. It is apparent from Table 2 that the test pieces had an extremely high impact strength and the degree of lowering of the heat distortion temperature from the olefinic copolymer-free test pieces was very small.

COMPARATIVE EXAMPLE 7

The PPS powder prepared in Referential Example 1 was treated with hot water, washed and dried in the same manner as in Example 9. The treated powder alone (without adding any olefinic copolymer) was pelletized and injection-molded to obtain test pieces. The Izod impact strength and heat distortion temperature of the test pieces were as shown in Table 2.

EXAMPLES 12 TO 14 AND COMPARATIVE EXAMPLE 7

The same procedure as in Example 9 was repeated except that the temperature in the treatment of the PPS powder prepared in Referential Example 1 with hot water altered from 180° C. to a temperature shown in Table 2 to obtain test pieces.

The properties of the obtained test pieces were as shown in Table 2.

EXAMPLE 15

The same procedure as in Example 9 was repeated except that the ethylene/glycidyl methacrylate (weight ratio: 88/12) copolymer was replaced with the copolymer having a weight ratio of 94/6 to obtain test pieces. The properties of the obtained test pieces were as shown in Table 2.

EXAMPLE 16

The same procedure as in Example 9 was repeated except that the amount of the olefinic copolymer was altered from 20 wt.% to 10 wt.%. The properties of the obtained test pieces were as shown in Table 2.

EXAMPLES 17 AND 18

The PPS powder treated with hot water in the same manner as in Example 9 was melt-mixed with the olefinic copolymer and glass fibers in amounts shown in Table 2 and the mixture was pelletized and injection-molded in the same manner as in Example 9. The properties of the obtained test pieces were as shown in Table 2.

TABLE 2

| No. | Treatment of PPS with hot water | Temp. in treatment with hot water (°C.) | Comonomer[1] ratio of olefinic copolymer | Proportion PPS[2] (wt. %) | Proportion Olefinic[2] copolymer (wt. %) | Proportion Glass[3] fibers (wt. %) | Izod impact strength With cut notch (kg·cm/cm) | Izod impact strength Without notch (kg·cm/cm) | Heat distortion temp. (high-load) (18.56 kg/cm²) (°C.) |
|---|---|---|---|---|---|---|---|---|---|
| Example | | | | | | | | | |
| 11 | Treated | 180 | 88/12 | 80 | 20 | — | 55 | 120 | 101 |
| 12 | Treated | 160 | 88/12 | 80 | 20 | — | 49 | 120 | 100 |
| 13 | Treated | 130 | 88/12 | 80 | 20 | — | 43 | 120 | 100 |
| 14 | Treated | 110 | 88/12 | 80 | 20 | — | 39 | 120 | 101 |
| 15 | Treated | 180 | 94/6 | 80 | 20 | — | 16 | 120 | 102 |
| 16 | Treated | 180 | 88/12 | 90 | 10 | — | 27 | 120 | 102 |
| 17 | Treated | 180 | 88/12 | 80 | 20 | 70 | 15 | 47 | 252 |
| 18 | Treated | 180 | 88/12 | 90 | 10 | 70 | 13 | 44 | 253 |
| Comp. Ex. | | | | | | | | | |
| 7 | Treated | 180 | — | 100 | 0 | — | 2.3 | 55 | 110 |
| 8 | Treated | 90 | 88/12 | 80 | 20 | — | 4.2 | 68 | 101 |

Notes:
[1]Weight ratio of ethylene to glycidyl methacrylate
[2]Ratio to the total of PPS and ethylene/glycidyl methacrylate copolymer (wt. %)
[3]Amount (parts by weight for 100 parts by weight of the total of PPS and ethylene/glycidyl methacrylate copolymer.

EXAMPLE 19

The PPS powder treated with hot water in the same manner as in Example 9 was dry-blended with the olefinic copolymer and polyethylene in a weight ratio of 80:10:10. After the melt-mixing followed by the pelletization and injection molding effected in the same manner as in Example 9, test pieces were obtained. The obtained test pieces had an Izod impact strength (cut and notched) of 32 kg·cm/cm-notch and a heat distortion temperature (high-load) of 103° C.

EXAMPLE 20

The same procedure as in Example 17 was repeated except that the polyethylene was replaced with polyethylene/polypropylene copolymer grafted with maleic andhydride (N-Toughmer MP-0610; a product of Mitsui Petrochemical Industries, Ltd.) to obtain test pieces. The obtained test pieces had an Izod impact strength (cut and notched) of 37 kg·cm/cm-notch and a heat distortion temperature (high-load) of 102° C.

EXAMPLE 21

About 2 kg of the PPS powder prepared in Referential Example 1 was added to 20 l of N-methyl pyrrolidone at about 100° C. The mixture was stirred continuously for about 30 min, filtered washed with deionized water at about 90° C. and dried at 120° C. under reduced pressure for 24 h to obtain powder.

The powder obtained as above was dry-blended with ethylene/glycidyl methacrylate (weight ratio: 88/12) copolymer in a weight ratio of 80/20. The mixture was melt-mixed and pelletized in a screw extruder at 290° to 310° C. Then, the pellets were fed in a screw in-line type injection molding machine at 290° to 300° C. to prepare test pieces for the evaluation of mechanical properties at a mold temperature of 140° to 150° C.

Izod impact strength (ASTM D-256) and heat distortion temperature (ASTM D-648) of the obtained test pieces were as shown in Table 3. It is apparent that they have an extremely high impact strength and the degree of lowering of the heat distortion temperature from the olefinic copolymer free test pieces was very small.

COMPARATIVE EXAMPLE 9

The PPS powder preferred in Referential Example 1 was treated with N-methylpyrrolidone washed and dried in the same manner as in Example 9. The treated powder alone (without adding any olefinic copolymer) was pelletized and injection-molded to obtain test pieces. The Izod impact strength and heat distortion temperature of the test pieces were shown in Table 3.

EXAMPLE 22

The same procedure as in Example 19 was repeated except that N-methyl pyrrolidone at about 100° C. used for the organic solvent treatment of the PPS powder obtained in Referential Example 1 was replaced with acetone at room temperature to obtain test pieces.

The properties of the obtained test pieces were as shown in Table 3.

EXAMPLE 23

PPS polymerization mixture was obtained in the same polymerization procedure as in Referential Example 1.

PPS product was filtered from polymerization mixture and washed with warm water (70° C.) four times. And then the product was added to 20 l of N,N-dimethyl formamide heated about 100° C. The mixture was stirred continuously for about 30 minutes and filtered. This N,N-dimethyl formamide treatment was repeated twice. Then, product was washed with deionized water at about 90° C. and dried at 120° C. under reduced pressure for 24 h to obtain powder.

The powder obtained as above was dry-blended with ethylene/glycidyl methacrylate (weight ratio: 94/6) copolymer in a weight ratio of 60/40. The mixture was melt-mixed, pelletized and injection molded to obtain test pieces in the same manner as in Example 19. The Izod impact strength and heat distortion temperature of the test pieces were as shown in Table 3.

EXAMPLE 24

PPS polymerization mixture was obtained in the same polymerization procedure as in Referential Example 1. The obtained PPS polymerization mixture was directly added to 20 ( of acetone, and stirred continuously for about 30 minutes. After filtration, PPS product was washed with water at 70° C. five times and then dried at 120° C. under reduced pressure for 24 h to obtain about 2 kg of PPS powder.

The PPS powder obtained as above was dry-blended with ethylene/glycidyl methacrylate (weight ratio:

88/12) copolymer in a weight ratio of 90/10. The mixture was melt-mixed, pelletized and injection molded to obtain test pieces in the same manner as in Example 19. The Izod impact strength and heat distortion temperature of the test pieces were as shown in Table 3.

EXAMPLE 25

The same procedure as in Example 22 was repeated except that 20 l of acetone was replaced with 20 l of N-methyl pyrrolidone to obtain test pieces.

The properties of the obtained test pieces were as shown in Table 3.

EXAMPLES 26 AND 27

The PPS powder organic solvent treated in the same manner as in Example 19, ethylene/glycidyl methacrylate (weight ratio: 88/12) copolymer and glass fiber were melt-mixed, pelletized and injection-molded in the same manner an in Example 19. The properties of the obtained test pieces were as shown in Table 3. They have an extremely high impact strength and the degree of lowering of the heat distortion temperature from olefinic copolymer free test pieces was very small.

COMPARATIVE EXAMPLE 10

The PPS powder treated with N-methyl pyrrolidone in the same manner as in Example 19 was melt-mixed with glass fibers in a ratio shown in Table 3. The mixture was pelletized and injection-molded in the same manner as in Example 19. The properties of the obtain test pieces were as shown in Table 3.

EXAMPLES 28, 29, AND 30

The same procedure as in Example 19 was repeated except that N-methyl pyrrolidone used for the organic solvent treatment of the PPS powder obtained in Referential Example 1 was replaced with polyethylene glycohol (Example 26), with dioxane (Example 27), and with dimethyl sulfoxide (Example 28) to obtain test pieces.

The properties of these obtained test pieces were as shown in Table 3.

What is claimed is:

1. A polyphenylene sulfide resin composition comprising:
   (A) 99.5 to 50% by weight of a polyphenylene sulfide resin and
   (B) 0.5 to 50% by weight of an olefinic copolymer containing 60 to 99.5% by weight of an α-olefin and 0.5 to 40% by weight of a glycidyl ester of an α,β-unsaturated carboxylic acid, characterized in that said polyphenylene sulfide resin (A) is immersed under stirring in at least one member selected from the group consisting of an acid, an acid solution and hot water which is at a temperature of 100° C. or higher for a time sufficient to improved its affinity with said olefinic copolymer (B).

2. A polyphenylene sulfide resin composition according to claim 1, wherein said acid is at least one acid selected from the group consisting of acetic, hydrochloric, sulfuric, phosphoric, silicic, carbonic and propoinic acids.

3. A polyphenylene sulfide resin composition according to claim 1, wherein the temperature of said hot water is 170° C. or higher.

4. A polyphenylene sulfide resin composition according to claim 1, wherein the proportions of the components (A) and the component (B) are 99 to 55% weight and 1 to 45% by weight respectively.

5. A polyphenylene sulfide resin composition according to a claim 1, wherein further contains at least one substance selected from the group consisting of reinforcing fibers, inorganic fillers, organic fire retardants and fire retarding assistants.

6. A polyphenylene sulfide resin composition comprising:
   (A) 99.5 to 50% by weight of a polyphenylene sulfide resin and
   (B) 0.5 to 50% by weight of an olefinic copolymer containing 60 to 99.5% by weight of an α-olefin and 0.5 to 40% by weight of a glycidyl ester of an α,β-unsaturated carboxylic acid, characterized in that said polyphenylene sulfide resin (A) is isolated as a powder from the reaction mixture after polymerization and then immersed under stirring in at least one member selected from the group consisting of an acid, an acid solution and hot water which is at a temperature of 100° C. or higher, and an organic solvent which is at a temperature from

TABLE 3

| No. | Organic solvent treatment of PPS | Organic solvent used for treatment | Comonomer[1] ratio of olefinic copolymer | Proportion PPS (wt. %) | Proportion Olefinic copolymer (wt. %) | Glass fibers (wt. %) | Izod impact strength With cut notch (kg · cm/cm) | Izod impact strength Without notch (kg · cm/cm) | Heat distortion temp. (18.56 kg/cm$^2$) (°C.) |
|---|---|---|---|---|---|---|---|---|---|
| Example | | | | | | | | | |
| 21 | Treated | NMP[2] | 88/12 | 80 | 20 | — | 63 | >120 | 101 |
| 22 | Treated | acetone | 88/12 | 80 | 20 | — | 60 | >120 | 101 |
| 23 | Treated | DMF[3] | 94/6 | 60 | 40 | — | 66 | >120 | 100 |
| 24 | Treated | acetone | 88/12 | 90 | 10 | — | 31 | >120 | 102 |
| 25 | Treated | NMP[2] | 88/12 | 90 | 10 | — | 33 | >120 | 102 |
| 26 | Treated | NMP[2] | 88/12 | 48 | 12 | 40 | 17 | 62 | 254 |
| 27 | Treated | NMP[2] | 88/12 | 54 | 6 | 40 | 14 | 51 | 255 |
| 28 | Treated | PEG[4] | 88/12 | 80 | 20 | — | 53 | >120 | 101 |
| 29 | Treated | dioxane | 88/12 | 80 | 20 | — | 49 | >120 | 101 |
| 30 | Treated | DMSO[5] | 88/12 | 80 | 20 | — | 61 | >120 | 101 |
| Comp. Ex. | | | | | | | | | |
| 9 | Treated | NMP | — | 100 | — | — | 2.2 | 36 | 102 |
| 10 | Treated | NMP | — | 60 | — | 40 | 8.2 | 38 | 260 |

Notes:
[1]Weight ratio of ethylene/glycidyl methacrylate
[2]N—methyl pyrrolidone
[3]N,N—dimethyl formamide
[4]polyethylene glycohol
[5]dimethyl sulfoxide room temperature to about 300° C., for a time sufficient to improve said polyphenylene sulfide resin's affinity with said olefinic copolymer (B).

7. A polyphenylene sulfide resin composition according to claim 6, wherein said organic solvent is at least one solvent selected from the group consisting of N-methyl pyrrolidone, acetone, N,N-dimethyl formamide, dimethyl sulfoxide and chloroform.

8. A process for producing a polyphenylene sulfide resin composition comprising the steps of:
   (1) Contacting a polyphenylene sulfide resin (A) by immersing under stirring in at least one member selected from the group consisting of an acid, an acid solution and hot water which is at a temperature of 100° C. or higher for a time sufficient to improve said polyphenylene sulfide resin's affinity with the following copolymer (B), and
   (2) melt-mixing 99.5% to 50% by weight of said resin (A) and 0.05 to 50% by weight of an olefinic copolymer (B) containing 60 to 99.5% by weight of an α-olefin and 0.5 to 40% by weight of a glycidyl ester of an α,β-unsaturated carboxylic acid.

9. A process for producing a polyphenylene sulfide resin composition comprising the steps of:
   (1) contacting a polyphenylene sulfide resin (A) which is isolated as a powder from a reaction mixture after polymerization by immersing under stirring in at least one member selected from the group consisting of an acid, an acid solution and hot water which is at a temperature of 100° C. or higher and an organic solvent which is at a temperature from room temperature to about 300° C. for a time sufficient to improve said polyphenylene sulfide resin's affinity with the following copolymer (B), and
   (2) melt-mixing 99.5 to 50% by weight of said resin (A) and 0.05 to 50% by weight of an olefinic copolymer (B) containing 60 to 99.5% by weight of an α-olefin and 0.5 to 40% by weight of a glycidyl ester of an α,β-unsaturated carboxylic acid.

* * * * *

UNITED STATES PATENT AND TRADEMARK OFFICE
CERTIFICATE OF CORRECTION

PATENT NO. : 4,889,893
DATED : Dec. 26, 1989
INVENTOR(S) : Hirokazu Kobayashi; Akihiko Kishimoto It is certified that error appears in the above-identified patent and that said Letters Patent is hereby corrected as shown below:

Column 7, line 40, delete "COMPARATIVE EXAMPLES 1 AND 2" insert --COMPARATIVE EXAMPLE 3--.

Column 8, line 7, change "wa" to --was--.

Column 9, line 18, before "N-Toughmer" insert --(--.

Column 14, line 11, change "improved" to --improve--.

Signed and Sealed this

Twenty-third Day of April, 1991

Attest:

HARRY F. MANBECK, JR.

*Attesting Officer*  *Commissioner of Patents and Trademarks*